(12) United States Patent
Lin et al.

(10) Patent No.: US 12,100,549 B2
(45) Date of Patent: *Sep. 24, 2024

(54) HYBRID ALUMINUM ELECTROLYTIC CAPACITOR AND METHOD FOR MAKING SAME

(71) Applicant: CAPXON ELECTRONIC TECHNOLOGY CO., LTD, Guangdong (CN)

(72) Inventors: Chu Lin, Guangdong (CN); Jun Xiong, Guangdong (CN)

(73) Assignee: CAPXON ELECTRONIC TECHNOLOGY CO., LTD., Shenzhen (CN)

( * ) Notice: Subject to any disclaimer, the term of this patent is extended or adjusted under 35 U.S.C. 154(b) by 1111 days.

This patent is subject to a terminal disclaimer.

(21) Appl. No.: 16/699,107

(22) Filed: Nov. 28, 2019

(65) Prior Publication Data

US 2020/0111621 A1 Apr. 9, 2020

Related U.S. Application Data

(63) Continuation of application No. PCT/CN2018/109430, filed on Oct. 9, 2018.

(51) Int. Cl.
*H01G 11/86* (2013.01)
*C25D 11/06* (2006.01)
(Continued)

(52) U.S. Cl.
CPC .......... *H01G 11/60* (2013.01); *C25D 11/06* (2013.01); *H01G 9/0029* (2013.01);
(Continued)

(58) Field of Classification Search
CPC ........ C25D 11/06; H01G 11/48; H01G 11/60; H01G 11/78; H01G 11/84; H01G 9/0029;
(Continued)

(56) References Cited

U.S. PATENT DOCUMENTS 11,244,793 B2 * 2/2022 Lin .................. H01G 11/60
2017/0309406 A1 10/2017 Tanimoto et al.

FOREIGN PATENT DOCUMENTS

CN 100426434 * 10/2008 .......... H01G 9/022
CN 202758754 U 2/2013
(Continued)

*Primary Examiner* — Lois L Zheng

(57) ABSTRACT

Disclosed are a hybrid aluminum electrolytic capacitor and a method of producing the same, where the electrolytic capacitor is impregnated in a film repairing fluid. The film repairing fluid includes an organic solvent having a b.p. of 180° C. or more, a small number of an inorganic and/or an organic acid and an amine having a b.p. 180° C. or more. The fluid has high withstand voltage and can provide repairing effect for the oxide film of the anode foil of the non-solid aluminum electrolytic capacitor. The hybrid aluminum electrolytic capacitor impregnated with the film repairing fluid of the invention has the characteristics of high voltage, high capacity, low impedance and small leakage current, so that the electrolytic capacitor can maintain low equivalent series resistance and low impedance in the high frequency range.

6 Claims, 1 Drawing Sheet

(51) Int. Cl.
*H01G 9/00* (2006.01)
*H01G 11/04* (2013.01)
*H01G 11/48* (2013.01)
*H01G 11/60* (2013.01)
*H01G 11/78* (2013.01)
*H01G 11/84* (2013.01)
H01G 9/045 (2006.01)
H01G 11/06 (2013.01)
H01G 11/58 (2013.01)
H01G 11/62 (2013.01)
H01G 11/64 (2013.01)

(52) U.S. Cl.
CPC ............. *H01G 11/48* (2013.01); *H01G 11/78* (2013.01); *H01G 11/84* (2013.01)

(58) Field of Classification Search
CPC ...... H01G 9/0032; H01G 9/028; H01G 9/035; H01G 9/07; H01G 9/14; H01G 9/145; H01G 9/151
See application file for complete search history.

(56) References Cited

FOREIGN PATENT DOCUMENTS

| | | | |
|---|---|---|---|
| CN | 103632851 A | 3/2014 | |
| CN | 105405661 A | 3/2016 | |
| CN | 107342164 A | 11/2017 | |
| JP | 2008-235896 | * 10/2008 | ............. H01G 9/145 |

* cited by examiner

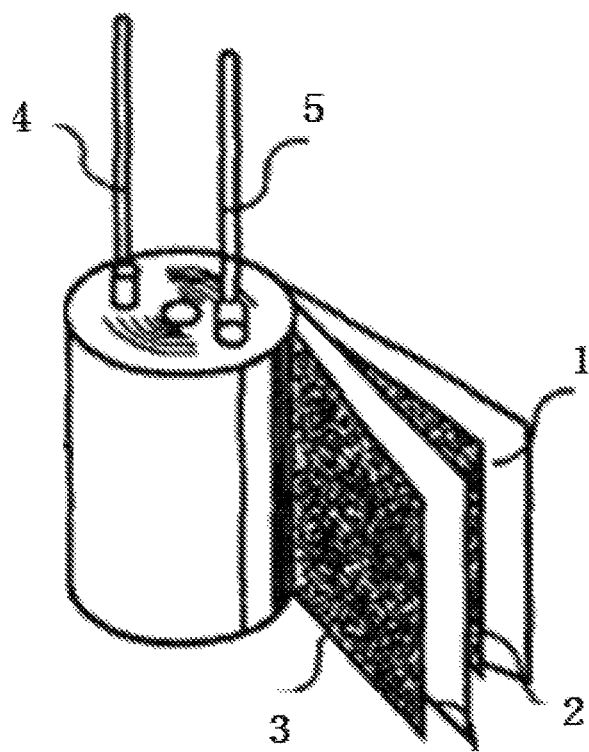

HYBRID ALUMINUM ELECTROLYTIC CAPACITOR AND METHOD FOR MAKING SAME

CROSS-REFERENCE TO RELATED APPLICATIONS

This application is a continuation of International Patent Application PCT/CN2018/109430, filed on Oct. 9, 2018. The content of the aforementioned application, including any intervening amendments thereto, is incorporated herein by reference.

TECHNICAL FIELD

The present application relates to electrolytic capacitors, and more particularly to a hybrid aluminum electrolytic capacitor and a method of producing the same.

BACKGROUND OF THE INVENTION

Aluminum electrolytic capacitors are widely used as basic components in electronic products, where electrolyte plays a core role in the aluminum electrolytic capacitor, and is closely associated with the service life, reliability and electrification performances of a capacitor, directly affecting the quality of the capacitor.

In the prior art, the impregnation of a capacitor element is performed in a well-known mixed conductive polymer electrolyte, where these electrolytes are generally adjusted to be higher than 10 wt % in view of the electrical conductivity. These electrolytes have a low withstand voltage, so that when the applied voltage varies, the composition of the electrolyte is required to be adjusted according to the rated voltage of the capacitor. Accordingly, the equipment is also required to be adjusted in the production process according to the change of voltage, resulting in a low efficiency. Moreover, the electrolyte used in a solid electrolytic capacitor is a solid conductive polymer, which has no repairing effect for the oxide film defective portion at the anode. If the solid electrolytic capacitor is used at a temperature of 85-150° C. for a long time, an increase may occur to the LC, and even a short circuit may happen.

SUMMARY

A first object of this application is to provide a film repairing fluid for a hybrid aluminum electrolytic capacitor to solve the above problems, which comprises an acid, an organic solvent and an amine, where the amine and the organic solvent both have a b.p. of 180° C. or more.

In an embodiment, the film repairing fluid further comprises an additive which is an organic phosphate ester and/or an organic nitrate, where the additive plays a role in inhibiting gas generation and reducing leakage current, which can improve cycle and storage performances of a lithium ion battery on the premise that the lithium ion battery is ensured to have an excellent capacity.

In an embodiment, considering the electrochemical stability and conductivity, the additive is preferably 0-1% by weight of the repairing fluid, and more preferably 0.2-0.5%.

In an embodiment, considering the electrical conductivity of the electrolyte and the internal resistance of the chemical capacitor, the acid and the amine both have a molality of 0-0.3 mol/kg.

In an embodiment, the acid and the amine both have a molality of 0.01-0.25 mol/kg.

In an embodiment, the acid and the amine are same in equivalent concentration, where the equivalent concentration of the acid refers to a molar concentration of hydrogen ions in the acid, and the equivalent concentration of the amine refers to a molar concentration of hydroxide ions ionized from the amine.

In an embodiment, the organic solvent is selected from ethylene glycol, diethylene glycol, propanediol, gamma-butyrolactone, gamma-valerolactone, sulfolane, polyethylene glycol, polypropylene glycol, diethylene glycol monoethyl ether, triethylene glycol monomethyl ether, propylene carbonate, 4-ethylanisole, 1-methoxy-4-propylbenzene, methyl sulfolane, glycerin, thiobenzoic acid, diethylene glycol monobutyl ether, diethylene glycol dibutyl ether, triethylene glycol monomethyl ether, glyceride, N-methylpyrrolidone or N-ethylpyrrolidone, or a combination thereof.

In an embodiment, the acid is selected from monochloroacetic acid, oxalic acid, propanedioic acid, succinic acid, glutaric acid, adipic acid, pimelic acid, octanedioic acid, azelaic acid, sebacic acid, 1,6-sebacic acid, maleic acid, fumaric acid, itaconic acid, phthalic acid, isophthalic acid, trimellitic acid, pyromellitic acid, benzoic acid, salicylic acid, mandelic acid, resorcinol acid, phosphoric acid, phosphorous acid, hypophosphorous acid, boric acid, fluoroboric acid, tetrafluoroboric acid, hexafluorophosphoric acid, benzenesulfonic acid, naphthalene sulfonic acid, boroglycolic acid, boric oxalic acid or borosalicylic acid, or a combination thereof.

In an embodiment, the amine is selected from nonylamine, decanamine, diaethylamin, triethanolamine, 2-methylaniline, ethylenediamine, urotropine or tributylamine, or a combination thereof.

In an embodiment, the film repairing fluid has an electrical conductivity of 0.5 ms/cm or less as well as a pH of 5-7 at 28-32° C.

A second object of the application is to provide a method for preparing a hybrid aluminum electrolytic capacitor, comprising:
(1) producing a capacitive element;
(2) impregnating the capacitive element in a forming solution; and applying a voltage to the capacitive element according to a voltage endurance of an anode foil to repair an oxide film defective portion on a surface of the anode foil of the capacitive element; wherein the oxide film defective portion is formed due to cutting, nailing and winding; wherein the forming solution is selected from ammonium dihydrogen phosphate solution, ammonium borate solution or ammonium adipate solution, or a combination thereof;
(3) impregnating the capacitive element in a conductive polymer dispersion and drying the impregnated capacitive element to form a conductive polymer layer of a certain thickness on an electrode foil of the capacitive element; and repeating the impregnating and drying to allow the capacitive element to have a capacitance withdrawing rate equal to or more than 85%;
(4) impregnating the capacitive element in a film repairing fluid of the hybrid aluminum electrolytic capacitor to cover the surface of the anode foil and an interior of a pit with a dense dielectric oxide film; and
(5) assembling and packaging the capacitive element in an aluminum casing.

A third object of the application is to provide a hybrid aluminum electrolytic capacitor, comprising a capacitive element and an aluminum casing, where the capacitive element is placed inside the aluminum casing, and comprises an anode foil, a cathode foil and an electrolytic paper. The anode foil and the cathode foil are respectively riveted with an anode guide pin and a cathode guide pin. The capacitive element is sequentially impregnated in a forming solution, a conductive polymer dispersion and the film repairing fluid, and then assembled and packaged in an aluminum casing.

Advantages of the present invention are described as follows.

1. The film repairing fluid of the present invention comprises an acid, an organic solvent with a b.p. above 180° C. and an amine with a b.p. above 180° C. The high b.p. of the components can ensure a stable working performance under high temperature. Moreover, a film repairing fluid with a high withstand voltage can be obtained by adjusting the acid, the organic solvent and the amine, which can be applied in a voltage ranging from 16 V to 400 V without changing the composition of the electrolyte.

2. The film repairing fluid of the present invention also has the repairing effect for the oxide film of the anode foil of the non-solid aluminum electrolytic capacitor, which is different from a general solid electrolyte showing no repairing effect for the oxide film. A failure mode of the general solid electrolyte is short circuit, while the repairing fluid provided herein for the impregnation of a capacitive element has a failure mode of open circuit and is not easy to suffer from short circuit.

3. The hybrid aluminum electrolytic capacitor of the present invention is processed by impregnating in a film repairing fluid, so that it can maintain a low equivalent series resistance and impedance in a high frequency range, and have a withstand voltage above 400 V. Therefore, the capacitor provided herein can be applied in a voltage ranging from 16 V to 400 V without changing the electrolyte preparation. In addition, the capacitor also has characteristics of high voltage, high capacity, low impedance and low leakage current.

BRIEF DESCRIPTION OF THE DRAWINGS

The FIGURE schematically shows the structure of a hybrid aluminum electrolytic capacitor of the invention.

DETAILED DESCRIPTION OF EMBODIMENTS

The technical solutions of the invention will be clearly and completely described below with reference to the embodiments. It is apparent that the embodiments below are merely part of the embodiments of the invention and are not intended to limit the invention. Any other embodiments made by those skilled in the art based on the embodiments disclosed herein without sparing any creative efforts, should fall within the scope of the invention.

Hereinafter, unless otherwise specified, wt % means weight percentage.

The application provides a film repairing fluid for a hybrid aluminum electrolytic capacitor to solve the problems mentioned in the Background, where the fluid includes an acid, an organic solvent with a b.p. of 180° C. or more and an amine with a b.p. of 180° C. or more.

The organic solvent is selected from ethylene glycol, diethylene glycol, propanediol, gamma-butyrolactone, gamma-valerolactone, tetramethylene sulfone, polyethylene glycol, polypropylene glycol, diethylene glycol monoethyl ether, triethylene glycol monomethyl ether, propylene carbonate, 1-methoxy-4-propylbenzene, 4-ethylanisole, methyl sulfolane, glycerin, thiobenzoic acid, diethylene glycol monobutyl ether, diethylene glycol dibutyl ether, glyceride, N-methylpyrrolidone or N-ethylpyrrolidone, or a combination thereof.

The acid is selected from an organic acid, an inorganic acid or a complex of an inorganic acid and an organic acid.

The inorganic acid is selected from phosphoric acid, phosphorous acid, hypophosphorous acid, alkyl phosphate, boric acid, fluoroboric acid, tetrafluoroboric acid, hexafluorophosphoric acid, benzenesulfonic acid or naphthalenesulfonic acid, or a combination thereof.

The organic acid is selected from monochloroacetic acid, the dicarboxylic acid such as oxalic acid, propanedioic acid, succinic acid, glutaric acid, adipic acid, pimelic acid, octanedioic acid, azelaic acid, sebacic acid, 1,6-sebacic acid, maleic acid, fumaric acid and itaconic acid, the aromatic carbonic acid such as phthalic acid, isophthalic acid, trimellitic acid, pyromellitic acid, benzoic acid, salicylic acid, mandelic acid or resorcinol acid, or a combination thereof.

The complex of an organic acid and an inorganic acid is selected from boronic glycolic acid, boric oxalic acid or borosalicylic acid, or a combination thereof.

The amine is selected from nonylamine, decanamine, diethylamin, triethanolamine, 2-methylaniline, ethylenediamine, urotropine or tributylamin, or a combination thereof.

From the viewpoint of the electrical conductivity of the electrolyte and the internal resistance of the chemical capacitor, the acid and the amine both preferably have a molality of 0-0.3 mol/kg, and more preferably 0.01-0.25 mol/kg, and the acid and the amine are preferably same in equivalent concentration.

The additive is an organic phosphate ester or an organic nitrate. From the viewpoints of electrochemical stability and conductivity, the additive is preferably 0-1% by weight of the film repairing fluid, and more preferably 0.2-0.5%.

The film repairing fluid of the application has a withstand voltage of 400 V or more, and an electric conductivity of 0.5 mS/cm or less as well as a pH of 5-7 at 28-32° C.

It should be understood that the film repairing fluid can be prepared according to the above-mentioned components and contents using a common method in the art. Similarly, the fluid of the invention can be adjusted in performances such as viscosity, electrical conductivity, pH value and withstand voltage in a common way in the art. For example, the electrical conductivity and the withstand voltage can be modified by adjusting the ratio of solute to solvent.

The application further provides a method of preparing a hybrid aluminum electrolytic capacitor, which is specifically described below.

Step (100)

An anode foil, a cathode foil and an electrolytic paper are cut to a desired size by a nailing machine. An anode guide pin and a cathode guide pin are respectively riveted to the anode foil and the cathode foil. Then the anode foil, the cathode foil and the electrolytic paper therebetween are coiled together into a shape of a cylinder. Finally, the cylinder is wrapped with a high temperature-resistant insulating tape to form a capacitive element.

Step (200)

The capacitive element is impregnated in a forming solution under a voltage to repair an oxide film defective portion on a surface of the anode foil of the capacitive element, where the voltage is applied according to the withstand voltage of the anode foil, and the oxide film defective portion is formed due to cutting, nailing and winding.

The forming solution is ammonium dihydrogen phosphate solution, ammonium borate solution or ammonium adipate solution. After the repair, the capacitor is cleaned with pure water and then dried.

The impregnation can be implemented under ultrasonication or under vacuum.

The drying is not particularly limited, and can be completed using a temperature-controlled hot-air drying furnace, where the drying temperature can be 130° C. or more. Since a drying temperature of 200° C. or more will cause oxidative deterioration of the conductive polymer, the drying is preferably performed at 180° C. or less. Considering the productivity, a time of the drying for volatilizing the high-boiling solvent is preferably 2 h or less.

Step (300)

The capacitive element is impregnated in a conductive polymer dispersion to form a conductive polymer diaphragm layer having a certain thickness on the electrode of the capacitive element.

The conductive polymer dispersion can be produced by an existing method. For example, poly(3,4-ethylenedioxythiophene) (PEDOT) is added to pure water to which a polystyrene sulfonic acid (PSS) solution is added under stirring in a water-cooling condition to produce a mixture. Iron (III) sulfate and persulfate, as an oxidizing auxiliary, are added to the mixture to carry out oxidative polymerization, then the reaction mixture is treated by ion-exchange resin and filtration to remove impurities. Finally, the reaction mixture can be dispersed under ultrasonication or high pressure to prepare a stable conductive polymer dispersion having small particles. An average particle size of the conductive polymer (median size d50) is preferably 100 nm or less. Moreover, a solid portion (PEDOT/PSS) of the dispersion is preferably 0-10 wt % or less, and more preferably 1-5 wt % considering the impregnation and productivity of the capacitor element.

The conductive polymer dispersion can also be prepared as follows. An organic solvent of a high b.p. is introduced to a self-made dispersion or a commercially available dispersion to obtain a mixture, which is further dispersed by high-pressure emulsification, ultrasonic emulsification or high-speed shear emulsification to obtain the conductive polymer dispersion. The organic solvent of a high b.p. is 0-20% by weight of the dispersion, preferably 0-10%, and more preferably 1-5%. The organic solvent of a high b.p. is aqueous and is preferably selected from ethylene glycol (b.p.: 197° C.), diethylene glycol (b.p.: 245° C.), propylene glycol (b.p.: 188° C.), gamma-butyrolactone (b.p.: 204° C.), gamma-valerolactone (b.p.: 207° C.), N-methylpyrrolidone (b.p.: 202° C.), sulfolane (b.p.: 287° C.), polyethylene glycol (b.p.: 250° C. or more), or polypropylene glycol (b.p.: 280° C. or more), or a combination thereof. The capacitor is hardly affected in capacitance in use even if it is not dried enough.

The organic solvent can be mixed with the solvent in the polymer dispersion selected from ethylene glycol, diethylene glycol, propanediol, gamma-butyrolactone, valerolactone, N-methylpyrrolidone, sulfolane, polyethylene glycol or polypropylene glycol, or a combination thereof.

After impregnated in the dispersion, the capacitive element is dried at a high temperature to form a dense conductive polymer film layer on the surface of the anode and cathode foil of the capacitive element and in the gap between the electrolytic paper. The conductive polymer film layer has a certain electrical conductivity and high voltage resistance, which can promote the repair of an oxide film defective portion of the anode foil, reducing the occurrence of a short circuit.

The withdrawing rate of the capacitance and electrostatic capacity after the impregnation in the film repairing fluid is preferably higher than 85%. If the capacitance withdrawing rate is lower than 85%, the capacitor element will show poor equivalent series resistance (ESR) and impedance characteristic (Z) when tested under a frequency of 100 KHz. The capacitive element can be repeatedly impregnated with the conductive polymer dispersion and dried to obtain a capacitance withdrawing rate of 85% or more.

The higher capacitive withdrawing rate can allow the size of the hybrid capacitor of the present invention to be substantially reduced relative to conventional solid capacitors in the case of the same indicated capacitive value. Therefore, the present invention has a high capacity while having a very low height (i.e., low thickness).

Step (400)

The capacitive element is impregnated with the film repairing fluid to cover the surface of the anode foil and the inside of the etch pit with a dense dielectric oxide film.

Step (500)

The capacitive element impregnated in the film repairing fluid is assembled and packaged in an aluminum casing. A top of the aluminum casing is provided with a rubber cover, which is provided with a positive terminal and a negative terminal respectively connected to the positive electrode foil and the negative electrode foil through a lead wire.

The application further provides a hybrid aluminum electrolytic capacitor (as shown in the FIGURE), which is prepared by the above method, where the hybrid aluminum electrolytic capacitor includes an anode guide pin (4), a cathode guide pin (5), an anode foil (3), an electrolytic paper (1) and a cathode foil (2).

It should be understood that the structure of the hybrid aluminum electrolytic capacitor of the application, such as a rubber cover structure of the capacitive element, is well known to those skilled in the art, and will not be further described in detail herein. The application can adopt a capacitor with a conventional structure in the art, or with a novel structure.

It should be understood that the hybrid aluminum electrolytic capacitor of the application can be any one of the available aluminum electrolytic capacitors, such as a horn-type aluminum electrolytic capacitor and a bolt-type aluminum electrolytic capacitor, which are well known to those skilled in the art. Given this, the structure and the working principle of the available aluminum electrolytic capacitors will not be described in detail herein.

It should be understood that the hybrid aluminum electrolytic capacitor provided herein can be applied to a charging pile module, a servo motor and the industrial frequency conversion.

In order to make objects, technical solutions and advantages clearer, the invention will be described in detail below with reference to the embodiments. It is apparent that the described embodiments are merely part of the embodiments of the invention, and are not intended to limit the invention. Any other embodiments, made by those skilled in the art based on the embodiments disclosed herein without sparing any creative efforts, should fall within the scope of the application. The capacitors prepared in the following embodiments can be tested for the capacitance loss using a conventional method in the art.

The embodiments of the application are illustratively described below.

Example 1

A hybrid aluminum electrolytic capacitor was prepared by the method below.

Step (100)

An aluminum foil with a dielectric film (withstand voltage 150 V) on the surface was used as an anode foil and another aluminum foil with a dielectric film (withstand voltage 2 V) on the surface was used as a cathode foil, where the two kinds of dielectric films were both formed through the surface corrosion and anodization for the aluminum foil. The anode and cathode foils were cut to a specified size, and respectively connected to a tab terminal of an external leading electrode. The anode and cathode foils were wrapped by a non-woven separator made of aramid fiber, polyester fiber or cellulose fiber having a density of 0.35 g/cm$^3$ and a thickness of 50 μm to complete the wrapping of the capacitive element.

Step (200)

The capacitive element was impregnated in an ammonium adipate forming solution under a voltage of 150 V and a current density of 0.05 Ma/pcs to repair an oxide film defective portion at the cut surface of the anode foil, where the oxide film defective portion was formed by cutting and nailing. After the formation, the capacitive element was washed with pure water and dried at 120° C.

Step (300)

The capacitive element was impregnated in a conductive polymer dispersion under −10 kPa for 10 min, and then dried at 150° C. for 60 min, where the conductive polymer dispersion contained 3 wt % of PEDOT/PSS and 3 wt % of ethylene glycol, and the remaining components were water and a small number of additives. And then the impregnation and drying were repeated twice to form a conductive polymer film on the surface of the capacitive element.

The electrical properties of the capacitive element obtained in step (300) were tested. The results were shown in Table 1.

Step (400)

The film repairing fluid consisted of 50 wt % of gamma-butyrolactone, 30 wt % of sulfolane, 18 wt % of polyethylene glycol, 0.4 wt % of phthalic acid and 0.4 wt % of benzoic acid, 0.8 wt % of triethanolamine as an amine and 0.4 wt % of phosphonic acid as an additive, where gamma-butyrolactone, sulfolane and polyethylene glycol were together used as the organic solvent, and phthalic acid and benzoic acid were together used the acid.

The capacitive element obtained in step (300) was impregnated in the film repairing fluid under a negative pressure of 10 kPa.

The impregnated capacitive element was assembled and packaged in an aluminum casing to prepare an aluminum electrolytic capacitor having a diameter of 10 mm and a length of 10 m.

The test results of the characteristics of the film repairing fluid of Example 1 were described below: electrical conductivity: 0.32 mS/cm (28-32° C.); pH: 5.2 (28-32° C.); water content: 0.15 wt %; and withstand voltage: 400 V or more.

Example 2

This example was basically the same as Example 1 with respect to the process, and the differences were only that in step (300), the process of impregnation with the conductive polymer dispersion and drying was performed twice, and the film repairing fluid for impregnation in step (400) contained 50 wt % of gamma-butyrolactone, 35 wt % of sulfolane and 14.5 wt % of polyethylene glycol (as an organic solvent), 0.25 wt % of benzoic acid as an acid and 0.25 wt % triethanolamine as an amine. The hybrid aluminum electrolytic capacitor prepared herein shared the same specifications with that prepared in Example 1.

The electrical properties of the capacitive element obtained in step (300) were tested, and the results were shown in Table 1.

The characteristic parameters of the film repairing fluid of Example 2 were shown as follows: electrical conductivity: 0.035 mS/cm (28-32° C.); pH: 6.1; water content: 0.18 wt %; and withstand voltage: 600 V or more.

Comparative Example

The Comparative Example was substantially the same with Example 1 in the operation steps except for the composition of the film repairing fluid used in step (400). And the hybrid aluminum electrolytic capacitor prepared herein shared the same specifications as that produced in Example 1. The electrolyte used for the impregnation in step (400) in the Comparative Example was a solution of 25 wt % phthalic acid-1,2,3,4-tetramethylimidazoline in gamma-butyrolactone, which was commonly used in a high-temperature resistant and long-life capacitor and had an electrical conductivity of 12 ms/cm.

Example 3

The example was basically the same with Example 1 with respect to the operation steps, and the difference is only that in step (300), the process of impregnation with the conductive polymer dispersion and drying was performed once. The hybrid aluminum electrolytic capacitor produced herein shared the same specifications with that produced in Example 1.

Example 4

The example was basically the same with Example 2 with respect to the operation steps, except that in step (300), the process of impregnation with the conductive polymer dispersion and drying was performed twice. The hybrid aluminum electrolytic capacitor produced herein shared the same specifications with that obtained in Example 2.

Example 5

The example was basically the same with Example 1 with respect to the operation steps, except that in step (300), the process of impregnation with the conductive polymer dispersion and drying was performed three times, and the film repairing fluid for impregnation in step (400) contained 46 wt % diethylene glycol monobutyl ether, 16 wt % polypropylene glycol and 30 wt % sulfolane (as an organic solvent), 2.8 wt % benzoic acid as an acid, 4.2 wt % tributylamine as an amine, 0.5 wt % phosphonic acid and 0.5 wt % p-nitrobenzoic acid as additives. The hybrid aluminum electrolytic capacitor produced herein shared the same specifications with that obtained in Example 1.

The characteristics of the film repairing fluid of Example 5 were shown as follows: electrical conductivity: 0.06 mS/cm (30° C.); pH: 5.5 (30° C.); water content: 0.16 wt %; and withstand voltage: 600 V or more.

Test 1 Effect of the Number of Times of Impregnation on the Withdrawing Rate of Electrostatic Capacity Since the impregnation process of the capacitive element in step (300) of Example 1 was the same as that of Example 5 and the impregnation process of the capacitive element in step (300) of Example 2 was the same as that of Example 4, the comparison was made herein mainly among the capacitive elements of Examples 1, 3 and 4. The results were shown in Table 1.

TABLE 1

Relationship between the number of times of impregnation and drying and withdrawing rate of electrostatic capacity

| Sample | Treatment for capacitive element | Electrostatic capacity (μF) | The withdrawing rate electrostatic capacity (%) | Equivalent series impedance (Ω) | impedance (Ω) |
|---|---|---|---|---|---|
| Example 1 | Impregnated with the conductive polymer dispersion and dried three times | 42.05 | 89.5 | 0.014 | 0.030 |
| Example 3 | Impregnated with the conductive polymer dispersion and dried once | 38.00 | 80.0 | 0.022 | 0.045 |
| Example 4 | Impregnated with the conductive polymer dispersion and dried twice | 40.50 | 85.3 | 0.017 | 0.033 |

The results indicated that the withdrawing rate of electrostatic capacity was improved with the increase in the number of times that the process of impregnation with a conductive polymer dispersion and drying was performed. In addition, in order to ensure good electrical characteristics of the capacitor, the capacitive element after treated by impregnation and drying must have a capacitance withdrawing rate of greater than 85%.

Test 2 Voltage Aging Test

The hybrid aluminum electrolytic capacitors prepared in Examples 1, 2 and 5 and the Comparative Example were subjected to aging respectively under a voltage of 42 V and 96 V at 125° C. for 60 min for the performance test. After the aging, parameters of 20 parallel samples were tested and averaged. The test frequency for the capacity was 120 HZ, while the test frequency for the equivalent series resistance and impedance was 100 KHZ.

The leakage current was tested as follows. 20 parallel samples were tested in each round at room temperature under a DC voltage of 35 V for 1 min. The electrical characteristic test results were recorded in Table 2.

capacitance withdrawing rate, small equivalent series resistance and impedance, indicating that the hybrid aluminum electrolytic capacitor impregnated with the film repairing fluid of the invention had high voltage, high capacity, low impedance and small leakage current.

In the case of a rated voltage of 35 V, the corresponding aging voltage of the capacitor was 42 V; and in the case of a rated voltage of 80 V, the corresponding aging voltage was 92 V. The electrolyte used for the impregnation in the comparative example could only be applied to capacitors with a rated voltage of 35 V, and failed to be applied to those with a rated voltage of 80 V. Since the sparking voltage of the electrolyte in the Comparative Example was about 70 V, the capacitor may easily suffer from short circuit due to the poor withstand voltage after impregnated with the electrolyte. Therefore, it was required to develop an electrolyte with higher withstand voltage for the capacitors with a rated voltage of 80 V. The film repairing fluids of Examples 1, 2 and 5 could be applied whether in a low voltage domain or a high voltage domain without adjusting the composition because the withstand voltage was higher than 500 V, and it may be even used in a capacitor having a rated voltage of 250 V.

Described above are merely preferred embodiments of the application, and are not intended to limit the application.

TABLE 2

Effect of voltage aging on capacitor parameters

| Sample | Aging voltage (V) | Electrostatic capacity (μF) | Equivalent series impedance (Ω) | Impedance (Ω) | Leakage current (μA) |
|---|---|---|---|---|---|
| Comparative Example | 42 | 47.8 | 0.014 | 0.030 | 2.1 |
| | 96 | all was shorted After the aging | | | |
| Example 1 | 42 | 47.2 | 0.016 | 0.032 | 2.7 |
| | 96 | 47.5 | 0.016 | 0.031 | 4.0 |
| Example 2 | 42 | 47.5 | 0.017 | 0.032 | 2.9 |
| | 96 | 47.7 | 0.017 | 0.033 | 4.5 |
| Example 5 | 42 | 47.6 | 0.015 | 0.030 | 2.4 |
| | 96 | 47.6 | 0.015 | 0.029 | 3.8 |

Compared to the comparative example, the hybrid aluminum electrolytic capacitors impregnated in the film repairing fluid of Examples 1, 2 and 3 did not suffer from a short circuit during the aging, which indicated that the film repairing fluid of the invention had a remarkable repairing effect for the oxide film, lowering the occurrence of a short circuit. The failure mode was open circuit. Moreover, the capacitors prepared in Examples 1, 2 and 5 all had high Various modifications, replacements, improvements and changes made by those skilled in the art without departing from the spirit of the application should fall within the scope of the application.

What is claimed is:

1. A film repairing fluid for a hybrid aluminum electrolytic capacitor, comprising an acid, an organic solvent, an additive and an amine;

wherein the amine and the organic solvent both have a boiling point of 180° C. or more; the additive is an organic phosphonate ester or a combination of the organic phosphonate ester and an organic nitrate; and the additive is 0.2-0.5% by weight of the film repairing fluid;

an equivalent concentration of the acid is same as an equivalent concentration of the amine, wherein the equivalent concentration of the acid refers to a molar concentration of hydrogen ions in the acid, and the equivalent concentration of the amine refers to a molar concentration of hydroxide ions ionized from the amine; and the film repairing fluid has a conductivity of 0.5 ms/cm or less.

2. The film repairing fluid of claim 1, wherein the acid and the amine both have a molality of 0.01-0.25 mol/kg.

3. The film repairing fluid of claim 1, wherein the organic solvent is selected from ethylene glycol, diethylene glycol, propanediol, gamma-butyrolactone, gamma-valerolactone, tetramethylene sulfone, polyethylene glycol, polypropylene glycol, diethylene glycol monoethyl ether, triethylene glycol monomethyl ether, propylene carbonate, 4-ethylanisole, 1-methoxy-4-propylbenzene, methyl sulfolane, glycerin, thiobenzoic acid, diethylene glycol monobutyl ether, diethylene glycol dibutyl ether, diethylene glycol monomethyl ether, triethylene glycol monomethyl ether, propylene carbonate, glyceride, N-methylpyrrolidinone or N-ethylpyrrolidone, or a combination thereof.

4. The film repairing fluid of claim 1, wherein the acid is selected from monochloroacetic acid, oxalic acid, propanedioic acid, succinic acid, glutaric acid, adipic acid, pimelic acid, octanedioic acid, azelaic acid, sebacic acid, 1,6-sebacic acid, maleic acid, fumaric acid, itaconic acid, phthalic acid, isophthalic acid, trimellitic acid, pyromellitic acid, benzoic acid, salicylic acid, mandelic acid, resorcinol acid, phosphoric acid, phosphorous acid, hypophosphorous acid, boric acid, fluoroboric acid, tetrafluoroboric acid, hexafluorophosphoric acid, benzenesulfonic acid, naphthalenesulfonic acid, boroglycolic acid, boric oxalic acid or borosalicylic acid, or a combination thereof.

5. The film repairing fluid of claim 1, wherein the amine is selected from nonylamine, decanamine, diethanolamine, triethanolamine, 2-methylaniline, ethylenediamine, urotropine or tributylamine, or a combination thereof.

6. The film repairing fluid of claim 1, wherein the film repairing fluid has a pH of 5-7 at 28-32° C.

* * * * *

UNITED STATES PATENT AND TRADEMARK OFFICE
CERTIFICATE OF CORRECTION

| | |
|---|---|
| PATENT NO. | : 12,100,549 B2 |
| APPLICATION NO. | : 16/699107 |
| DATED | : September 24, 2024 |
| INVENTOR(S) | : I-Chu Lin and Jun Xiong |

It is certified that error appears in the above-identified patent and that said Letters Patent is hereby corrected as shown below:

On the Title Page

Item [72] Please correct the spelling of the name of the first inventor. It should be:
I-CHU LIN Signed and Sealed this
Fifth Day of November, 2024

Katherine Kelly Vidal
*Director of the United States Patent and Trademark Office*